(12) United States Patent
Han et al.

(10) Patent No.: US 10,572,735 B2
(45) Date of Patent: Feb. 25, 2020

(54) DETECT SPORTS VIDEO HIGHLIGHTS FOR MOBILE COMPUTING DEVICES

(71) Applicant: Beijing Shunyuan Kaihua Technology Limited, Haidian District, Beijing (CN)

(72) Inventors: Zheng Han, Beijing (CN); Xiaowei Dai, Beijing (CN); Xianjun Huang, Beijing (CN); Fan Yang, Beijing (CN)

(73) Assignee: BEIJING SHUNYUAN KAIHUA TECHNOLOGY LIMITED, Beijing (CN)

( * ) Notice: Subject to any disclaimer, the term of this patent is extended or adjusted under 35 U.S.C. 154(b) by 230 days.

(21) Appl. No.: 14/675,464

(22) Filed: Mar. 31, 2015

(65) Prior Publication Data

US 2016/0292510 A1 Oct. 6, 2016

(51) Int. Cl.
*G06K 9/00* (2006.01)
*G06K 9/46* (2006.01)
(Continued)

(52) U.S. Cl.
CPC ..... *G06K 9/00724* (2013.01); *G06K 9/00751* (2013.01); *G06K 9/4628* (2013.01);
(Continued)

(58) Field of Classification Search
CPC ........... G06K 9/00724; G06K 9/00751; G11B 27/06; G11B 27/031
See application file for complete search history.

(56) References Cited

U.S. PATENT DOCUMENTS 5,610,590 A 3/1997 Johnson et al.
5,819,206 A 10/1998 Horton et al.
(Continued)

FOREIGN PATENT DOCUMENTS

CN 101420579 A 4/2009
CN 102414680 A 4/2012
(Continued)

OTHER PUBLICATIONS

U.S. Appl. No. 14/629,852, filed Feb. 24, 2015, 66 Pages (Application not yet published).
(Continued)

*Primary Examiner* — Gelek W Topgyal
(74) *Attorney, Agent, or Firm* — Young Basile Hanlon & MacFarlane, P.C.

(57) ABSTRACT

A solution is provided for detecting in real time video highlights in a sports video at a mobile computing device. A highlight detection module of the mobile computing device extracts visual features from each video frame of the sports video using a trained feature model and detects a highlight in the video frame based on the extracted visual features of the video frame using a trained detection model. The feature model and detection model are trained with a convolutional neural network on a large corpus of videos to generate category level and pair-wise frame feature vectors. Based on the detection, the highlight detection module generates a highlight score for each video frame of the sports video and presents the highlight scores to users of the computing device. The feature model and detection model are dynamically updated based on the real time highlight detection data collected by the mobile computing device.

20 Claims, 9 Drawing Sheets

(51) Int. Cl.
  *G11B 27/036* (2006.01)
  *G11B 27/034* (2006.01)
  *G11B 27/28* (2006.01)
  *G11B 27/031* (2006.01)
  *G11B 27/06* (2006.01)

(52) U.S. Cl.
  CPC .......... *G11B 27/031* (2013.01); *G11B 27/034* (2013.01); *G11B 27/036* (2013.01); *G11B 27/06* (2013.01); *G11B 27/28* (2013.01)

(56) References Cited

U.S. PATENT DOCUMENTS

| | | | |
|---|---|---|---|
| 6,224,493 B1 | 5/2001 | Lee et al. | |
| 7,978,081 B2 | 7/2011 | Shears et al. | |
| 8,109,816 B1 | 2/2012 | Grober | |
| 8,282,487 B2 | 10/2012 | Wilson et al. | |
| 8,337,335 B2 | 12/2012 | Dugan | |
| 8,409,024 B2 | 4/2013 | Marty et al. | |
| 8,409,025 B2 | 4/2013 | Stites et al. | |
| 8,449,402 B2 | 5/2013 | Jaekel et al. | |
| 8,523,696 B2 | 9/2013 | Kamino et al. | |
| 8,589,114 B2 | 11/2013 | Papadourakis | |
| 8,593,286 B2 | 11/2013 | Razoumov et al. | |
| 8,819,024 B1* | 8/2014 | Toderici | G06F 17/30731 |
| | | | 707/740 |
| 8,903,521 B2 | 12/2014 | Goree et al. | |
| 8,905,855 B2 | 12/2014 | Fitzpatrick et al. | |
| 8,923,607 B1* | 12/2014 | Kwatra | G06K 9/00724 |
| | | | 382/159 |
| 8,941,723 B2 | 1/2015 | Bentley et al. | |
| 8,944,928 B2 | 2/2015 | Kaps et al. | |
| 8,956,238 B2 | 2/2015 | Boyd et al. | |
| 9,039,527 B2 | 5/2015 | Bentley et al. | |
| 9,087,297 B1* | 7/2015 | Filippova | G06F 17/30781 |
| 9,646,073 B2* | 5/2017 | Mashinchi | G06F 17/30595 |
| 2001/0051516 A1 | 12/2001 | Nakamura et al. | |
| 2004/0111432 A1* | 6/2004 | Adams, Jr. | G06F 17/30256 |
| 2005/0032582 A1 | 2/2005 | Mahajan et al. | |
| 2005/0125223 A1* | 6/2005 | Divakaran | G06F 17/30787 |
| | | | 704/223 |
| 2005/0155055 A1 | 7/2005 | Li | |
| 2005/0251532 A1* | 11/2005 | Radhakrishnan | |
| | | | G06F 17/30787 |
| 2005/0272516 A1 | 12/2005 | Gobush | |
| 2005/0286774 A1* | 12/2005 | Porikli | G06K 9/00335 |
| | | | 382/225 |
| 2006/0025229 A1 | 2/2006 | Mahajan et al. | |
| 2006/0166738 A1 | 7/2006 | Eyestone et al. | |
| 2007/0271256 A1* | 11/2007 | Chang | G06F 17/30265 |
| 2007/0294716 A1* | 12/2007 | Jeong | G06K 9/00711 |
| | | | 725/19 |
| 2008/0085778 A1 | 4/2008 | Dugan | |
| 2008/0193016 A1* | 8/2008 | Lim | G06F 17/30787 |
| | | | 382/190 |
| 2009/0048044 A1 | 2/2009 | Oleson et al. | |
| 2009/0297032 A1* | 12/2009 | Loui | G06F 17/30256 |
| | | | 382/195 |
| 2009/0299999 A1* | 12/2009 | Loui | G06F 17/30256 |
| 2010/0005485 A1* | 1/2010 | Tian | G06F 17/30787 |
| | | | 725/32 |
| 2010/0103269 A1 | 4/2010 | Wilson et al. | |
| 2010/0144414 A1 | 6/2010 | Edis et al. | |
| 2010/0186052 A1 | 7/2010 | Hyun et al. | |
| 2010/0323794 A1 | 12/2010 | Su | |
| 2012/0106800 A1* | 5/2012 | Khan | G06K 9/00651 |
| | | | 382/104 |
| 2012/0189273 A1* | 7/2012 | Folgner | H04N 9/8227 |
| | | | 386/241 |
| 2013/0251340 A1* | 9/2013 | Jiang | G06K 9/00718 |
| | | | 386/244 |
| 2013/0282747 A1* | 10/2013 | Cheng | G06F 17/30023 |
| | | | 707/758 |
| 2013/0286208 A1* | 10/2013 | Bala | G06K 9/00771 |
| | | | 348/149 |
| 2015/0208023 A1* | 7/2015 | Boyle | H04N 21/00 |
| | | | 386/278 |
| 2018/0012077 A1* | 1/2018 | Laska | G06K 9/00711 |
| 2018/0025230 A9* | 1/2018 | Laska | G06K 9/00711 |
| | | | 382/103 |

FOREIGN PATENT DOCUMENTS

| | | | | |
|---|---|---|---|---|
| EP | 2079231 A1 * | 7/2009 | | G07F 17/32 |
| JP | WO 9962056 A1 * | 12/1999 | | G10L 19/005 |
| WO | WO 03-034720 A2 | 4/2003 | | |
| WO | WO 2005-057931 A2 | 6/2005 | | |
| WO | WO 2009053869 A2 * | 4/2009 | | H04N 7/17318 |

OTHER PUBLICATIONS

Donahue, J., et al., "DeCAF: A Deep Convolutional Activation Feature for Generic Visual Recognition," Computer Vision and Pattern Recognition, Oct. 6, 2013, 10 Pages.

Github "caffe-android-lib," sh1r0, 2015, 2 Pages, [online] [retrieved on Apr. 28, 2015] Retrieved from the internet <URL:https://github.com/sh1r0/caffe-android-lib>.

Ji, S., et al., "3D Convolutional Neural Networks for Human Action Recognition," IEEE Transactions on Pattern Analysis and Machine Intelligence, Mar. 6, 2012, pp. 221-231, vol. 35, No. 1.

Jia, Y., et al., "Caffe: Convolutional Architecture for Fast Feature Embedding," Proceedings of the ACM International Conference on Multimedia MM'14, 2014, pp. 675-678.

Krizhevsky, A., et al., "ImageNet Classification with Deep Convolutional Neural Networks," NIPS 2006, 9 Pages.

Nair, V., et al., "Rectified linear units improve restricted boltzmann machines." ICML10, 2010, 8 Pages.

Srivastava, N., et al., "Dropout: A simple way to prevent neural networks from overfitting." Journal of Machine Learning Research, 2014, vol. 15, pp. 1929-1958.

Stanford "Convolutional Neural Network," UFLDL Tutorial, 3 Pages, [online] [Retrieved on Apr. 30, 2015] Retrieved from the internet <URL:http://ufldl.stanford.edu/tutorial/supervised/ConvolutionalNeuralNetwork/>.

Wang, J., et al., "Learning Fine-grained Image Similarity with Deep Ranking," Computer Vision and Pattern Recognition, 2014, 8 Pages.

Wikipedia, "Convolutional Neural Network," Last Modified on Apr. 11, 2015, 8 Pages, [online] [Retrieved on Apr. 30, 2015] Retrieved from the internet <URL:http://en.wikipedia.org/wiki/Convolutional_neural_network>.

Allen, R., "Wireless Sensor Architecture Uses Bluetooth Standard" Electronic Design, Aug. 7, 2000, 5 Pages, Can be retrieved from <URL:http://electronicdesign.com/communications/wireless-sensor-architecture-uses-bluetooth-standard>.

Arfwedson, H., et al., "Ericsson's Bluetooth Modules," Ericsson Review, 1999, No. 4, pp. 198-205, <URL:http://www.ericsson.com/ericsson/corpinfo/Pub.s/review/1999_04/files/19990404.pdf>.

Bishop, R., "LabVIEW 8 Student Edition," 2007, 12 pages, Pearson Prentice-Hall, Upper Saddle River, NJ.

First Annual "Better Golf Through Technology," Better Golf Through Technology Conference, Feb. 17-18, 2006, 1 page, [Archived on web.archive.org on Mar. 14, 2006] Can be Retrieved at <URL:https://web.archive.org/web/20060314063211/http://www.bettergolfthroughtechnology.com/>.

Home Page for "Concept2: Training," 1 page, [Archived on web.archive.org on Feb. 5, 2009] Can be Retrieved at <URL:http://web.archive.org/web/20090205092657/http://concept2.com/us/training/default.asp>.

Home Page for Expresso.com, 2 pages, [Archived on web.archive.org on Apr. 29, 2009] Can be Retrieved at <URL:http://web.archive.org/web/20090426023759/http://expresso.com/products_services/index.html#>.

Honan, M., "Apple unveils iPhone," Macworld, Jan. 89, 2007, 4 Pages, can be retrieved at <URL:http://www.macworld.com/article/1054769/iphone.html>.

(56) References Cited

OTHER PUBLICATIONS

InvenSense, "InvenSense™ Unveils World's 1st IMU Solution for Consumer Appl.s" InvenSense, Apr. 6, 2010, 2 pages.

Kalia, M., et al., "Efficient Policies for Increasing Capacity in Bluetooth: An Indoor Pico-Cellular Wireless System," IBM India Research Laboratory, 2000, 5 pages.

Linx Technologies, "HP3 Series Transmitter Module Data Guide" Linx Technologies, Inc., 2008, Revised Jul. 27, 2011, 13 Pages.

Otto, C., et al., "System Architecture of a Wireless Body Area Sensor Network for Ubiquitous Health Monitoring," Journal of Mobile Multimedia, 2006, pp. 307-326, vol. 1, No. 4.

Rao, R., et al., "Demand-based Bluetooth Scheduling," Pennsyvania State University, Sep. 27, 2001, 13 pages, Can be retrieved at <URL:http://www.cse.psu.edu/~gik2/papers/Bluetooth1.doc>.

Roving Networks, "Blue Sentry RN-8005-CB Data Sheet," 2009, 1 page.

Sanders, K., "Japanese WII Price, Release Date Revealed," IGN US, Sep. 13, 2006, 1 Page, can be retrieved at <URL:http://www.ign.com/articles/2006/09/14/japanese-wii-price-release-date-revealed>.

SmartSwing, "SmartSwing Introduces Affordable Intelligent Golf Club," Press Release, Jul. 19, 2005, 2 pages, [Archived on web.archive.org on Jun. 13, 2006] Can be Retrieved at <URL:https://web.archive.org/web/20060613114451/http://www.smartswinggolf.com/site/news/pr_2006_jan_23_aus.html>.

Solid State Technology, "MEMS Enable Smart Golf Clubs," Extension Media, Jan. 6, 2005, 3 pages,[Archived on web.archive.org on Jan. 15, 2016] Can be Retrieved at <URL:https://web.archive.org/web/20160115202844/http://electroiq.com/blog/2005/01/mems-enable-smart-golf-clubs/>.

Takahashi, D., "Facebook, Twitter, Last.fm coming to Xbox Live this fall" Venture Beat, Jun. 1, 2009, 5 Pages, Can be retrieved from <URL:http://venturebeat.com/2009/06/01/facebook-coming-to-xbox-live-as-microsoft-beefs-up-other-entertainment-on-xbox-360/>.

The iClub System™ "iClub.net—Contact," Fortescue Corp. 2001-2005, 1 Page, [Archived on web.archive.org on Apr. 9, 2005] Can be Retrieved at <URL:https://web.archive.org/web/20050409111624/http://www.iclub.net/contact.html>.

The iClub System™ "iClub.net—Products," Fortescue Corp. 2001-2005, 1 Page, [Archived on web.archive.org on Jul. 10, 2005] Can be Retrieved at <URL:https://web.archive.org/web/20050710075533/http://www.iclub.net/products-iclub.html.

The iClub System™ "iClub.net—Products ICLUB$^e$," Fortescue Corp. 2001-2005, 1 Page, [Archived on web.archive.org on Apr. 14, 2005] Can be Retrieved at <URL:https://web.archive.org/web/20050414233840/http://www.iclub.net/products-iclube.html.

The iClub System™ "iClub.net—Products ICLUB (Full Swing)," Fortescue Corp. 2001-2005, 1 Page, [Archived on web.archive.org on Apr. 14, 2005] Can be Retrieved at <URL:https://web.archive.org/web/20050414233828/http://www.iclub.net/products-iclub.html.

The iClub Product Brochure, 2001-2005, 2 pages.

Tuite, D., "Motion-Sensing MEMS Gyros and Accelerometers Are Everywhere," Electronic Design, Jul. 9, 2009, 6 pages, Can be retrieved from <URL:http://electronicdesign.com/analog/motion-sensing-mems-gyros-and-accelerometers-are-everywhere>.

Webster's New College Dictionary, Definition for "Virtual Reality," (3rd ed. 2008), 3 Pages.

Webpage for zigbees.com, 4 Pages, [online] [retrieved on Mar. 14, 2016] Can be retrieved at <URL:http://www.zigbees.com/h_start.htm>.

Wheeler, A, et al., "Introduction to Engineering Experimentation," 2nd Edition, 2004, Chapter 4, 10 pages, Pearson—Prentice-Hall, Upper Saddle River, NJ.

Affidavit of Christopher Butler dated Jan. 15, 2016 regarding "Rinton Press—Publisher in Science and Technology," 6 pages, [Archived on web.archive.org on Jan. 3, 2007] Can be Retrieved at <URL:https://web.archive.org/web/20070103234656/http://rintonspress.com/journals/jmmonline.html>.

Affidavit of Christopher Butler dated Jan. 25, 2016 regarding "SmartWing Intelligent Clubs," 46 Pages, [Archived on web.archive.org on Apr. 11, 2006] Can be Retrieved at <URL:https://web.archive.org/web/20060411113841/http://www.smartswinggolf.com/site/>.

Affidavit of Christopher Butler dated Feb. 19, 2016 regarding "Concept2: Training," 5 pages, [Archived on web.archive.org on Feb. 5, 2009] Can be Retrieved at <URL:http://web.archive.org/web/20090205092657/http://concept2.com/us/training/default.asp>.

Certified File History of U.S. Pat. No. 8,905,855, Feb. 2, 2016, 709 Pages.

Certified File History of U.S. Pat. No. 8,941,723, Feb. 2, 2016, 929 Pages

File History of U.S. Pat. No. 8,903,521, 2015, 406 pages.

Certified File History of U.S. Pat. No. 8,944,928, Feb. 2, 2016, 647 Pages.

Certified File History of U.S. Pat. No. 9,039,527, Feb. 2, 2016, 1047 Pages.

Declaration of Dr. Steven M. Nesbit, U.S. Pat. No. 8,905,855, Feb. 24, 2016, 235 Pages.

Declaration of Dr. Steven M. Nesbit, U.S. Pat. No. 8,941,723, Feb. 24, 2016, 219 Pages.

Declaration of Dr. Steven M. Nesbit, U.S. Pat. No. 8,903,521, Feb. 24, 2016, 250 Pages.

Declaration of Dr. Steven M. Nesbit, U.S. Pat. No. 8,944,928, Feb. 24, 2016, 195 Pages.

Declaration of Dr. Steven M. Nesbit, U.S. Pat. No. 9,039,527, Feb. 24, 2016, 227 Pages.

Curriculum Vitae of Dr. Steven M. Nesbit, Feb. 24, 2016, 10 pages.

Claim Limitation Reference Nos. '855 Petition, Feb. 24, 2016, 6 pages.

Claim Limitation Reference Nos. '723 Petition, Feb. 24, 2016, 5 pages.

Claim Limitation Reference Nos. '521 Petition, Feb. 24, 2016, 4 pages.

Claim Limitation Reference Nos. '928 Petition, Feb. 24, 2016, 3 pages.

Claim Limitation Reference Nos. '527 Petition, Feb. 24, 2016, 4 pages.

PCT International Search Report and Written Opinion for PCT/US2016/021868, dated Jul. 27, 2016, 9 Pages.

\* cited by examiner

DETECT SPORTS VIDEO HIGHLIGHTS FOR MOBILE COMPUTING DEVICES

BACKGROUND

This invention relates generally to digital content processing and particularly to detecting video highlights in sports videos in real time for mobile computing devices.

Smart handheld devices, such as smart phones and tablet computers, have become increasingly popular. The increased availability and bandwidth of network access (for wired and wireless networks) have enabled more communication platforms for digital content consumption and sharing, such as recording sports videos by sports funs using their smart phones and sharing video highlights in the sports videos with others. A video highlight of a sports video is a portion of the sports video and represents a semantically important event captured in the sports video, e.g., a short video clip capturing goals or goal attempts in a soccer game video clip.

Some conventional solutions of video highlight detection for mobile computing devices rely on user manual selection. Given the complex spatiotemporal nature of sports videos, it is timing consuming and technically challenging to efficiently locate and select video highlights from a long video clip. For example, a 90-minute long video clip of a soccer game may contain three highlights capturing the three goal events, each of which may only last for 10~20 seconds.

Alternatively, some existing solutions allow users to upload the sports videos captured by their mobile phones to a computer server in a cloud computing environment for video highlight detection. However, solutions for server-side video highlight detection are generally not expected to provide real time instantaneous detection result to users, which degrades user experience with video highlight detection.

SUMMARY

Embodiments of the invention provide a solution for detecting video highlights of a sports video in real time for mobile computing devices, e.g., mobile phones. A video highlight of a sports video is a portion of the sports video and represents a semantically important event captured in the sports video. A highlight detection module of the mobile computing device extracts visual features from each buffered video frame of the sports video using a trained feature model and detects a highlight in the buffered video frame based on the extracted visual features of the video frame by applying a trained detection model. Based on the detection, the highlight detection module generates a highlight score for each video frame of the sports video and presents the highlight scores to users of the mobile computing device for interaction.

The feature model is trained with a convolutional neural network on a large corpus of videos to generate category level visual features associated with each class of sports videos. The detection model generates pair-wise frame feature vectors based on the category level visual features. The feature model is dynamically updated based on the real time highlight detection data collected by the mobile computing device. The detection model is dynamically updated based on the real time highlight detection data and user interactions with the presented highlight scores of sports videos collected by the mobile computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
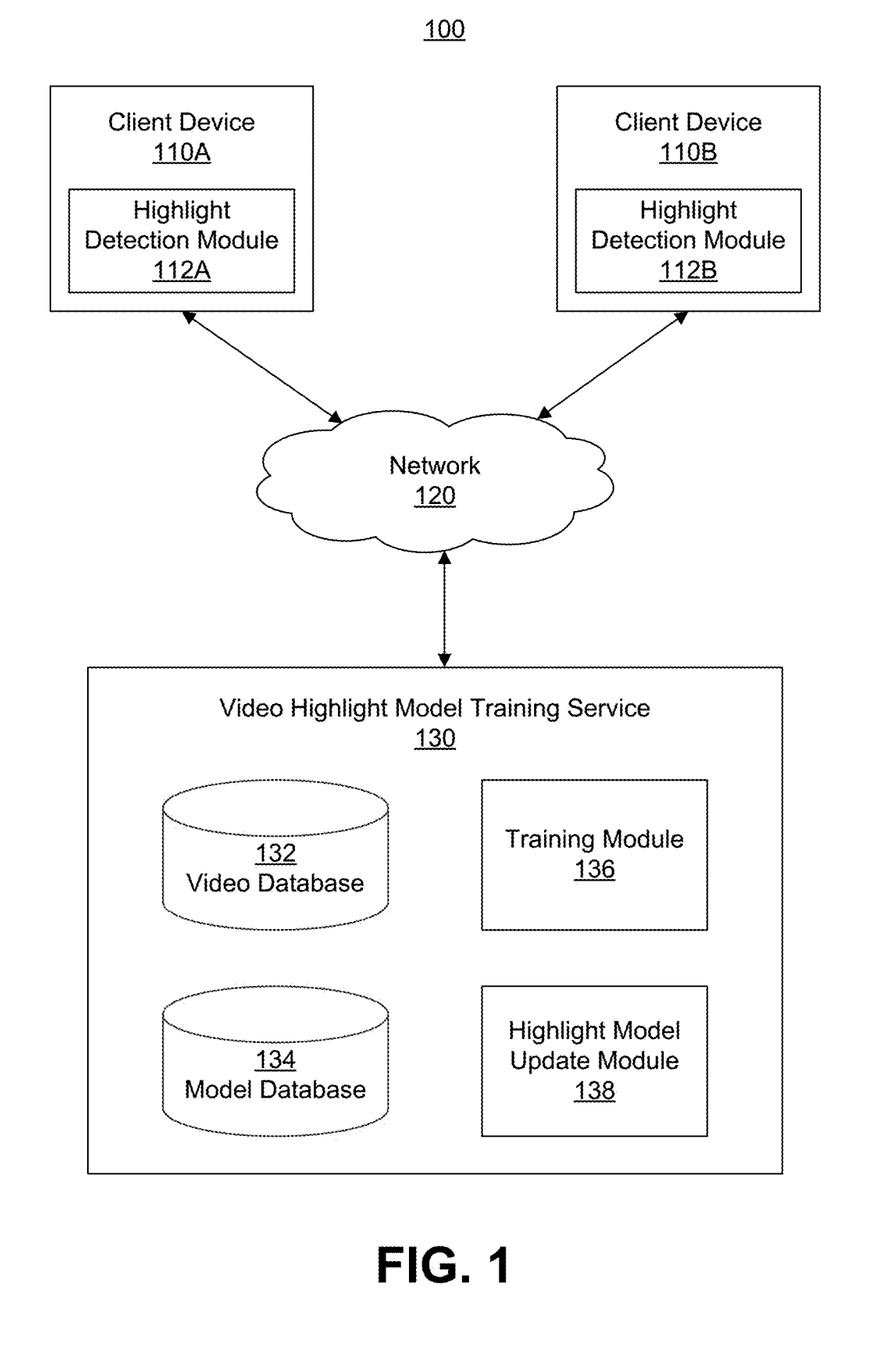
FIG. 1 is a block diagram of a computing environment for detecting video highlights in sports videos according to one embodiment.

FIG. 1 is a block diagram of a computing environment 100 for detecting video highlights in sports videos according to one embodiment. The embodiment illustrated in FIG. 1 includes multiple client devices 110 (e.g., 110A and 110B) and video highlight model training service 130 connected to each other by a network 120. Embodiments of the computing environment 100 can have many client devices 110 and video highlight model training service 130 connected to the network 120. Likewise, the functions performed by the various entities of FIG. 1 may differ in different embodiments.

A client device 110 is an electronic device used by a user to perform functions such as recording a sports video, consuming digital content, executing software applications, browsing websites hosted by web servers on the network 120, downloading files, and the like. For example, the client device 110 may be a smart phone, or a tablet, notebook, or desktop computer. The client device 110 includes and/or interfaces with a display device on which the user may view videos and other content. In addition, the client device 110 provides a user interface (UI), such as physical and/or on-screen buttons, with which the user may interact with the client device 110 to perform functions such as viewing, selecting, and consuming digital content such as video highlights of sports videos. In one embodiment, the client device 110 has a highlight detection module 112 (e.g., 112A for client device 110A and 112B for client device 110B) for detecting video highlights in real time in a sports video received by the client device 110 using video highlight models trained by the video highlight model training service 130. The highlight detection module 112 is further described below with reference to the description of FIG. 4.

The video highlight model training service 130 illustrated in the embodiment of FIG. 1 includes a video database 132, a model database 134, a training module 136 and a highlight model update module 138. Other embodiments of the video highlight model training service 130 can have additional and/or different modules. The video database 132 stores a large video corpus of sports videos of various types, e.g., American football, soccer, table tennis/ping pong, tennis and basketball. The model database 134 stores a feature model and a video highlight detection model trained by the training module 136 and features vectors generated by the feature model and the video highlight detection model.

The training module 136 trains a feature model with a deep learning capacity such as convolutional neural network (CNN) to classify the sports videos stored in the video database 132 into different classes. Each class of the sports video is associated with multiple feature vectors describing the characteristics of the class. The training module 136 selects a subset of the sports videos from the videos stored in the video database 132 and trains a video highlight detection model using the features learned from the feature model training. The training module 136 provides the trained feature model, the feature vectors associated with classified sports videos, the video highlight detection model and pair-wise frame feature vectors to the highlight detection module 112 of the client device 110 for detecting, in real time, video highlights in sports video received by the client device 110. The training module 136 is further described below with reference to the description of FIG. 3.

The highlight model update module 138 dynamically updates the feature vectors, the feature model and the video highlight detection model based on real time video highlight detection of sports videos received by the client device 110. In one embodiment, the highlight model update module 138 dynamically updates the feature vectors and the feature model based on the features vectors of the sports videos received by the client device 110. Responsive to user interacting with video highlights detected by the highlight detection module 112 of the client device 110, the highlight model update module 138 dynamically updates the highlight detection model based on the user interaction with the video highlights of the sports videos. The highlight model update module 138 is further described with reference to the description of the highlight detection module 112 of FIG. 4.

The network 120 enables communications among the client devices 110 and the video highlight model training service 130. In one embodiment, the network 120 comprises the Internet and uses standard communications technologies and/or protocols, e.g., clouding computing. In another embodiment, the entities can use custom and/or dedicated data communications technologies.

Computing System Architecture

Figure 2:
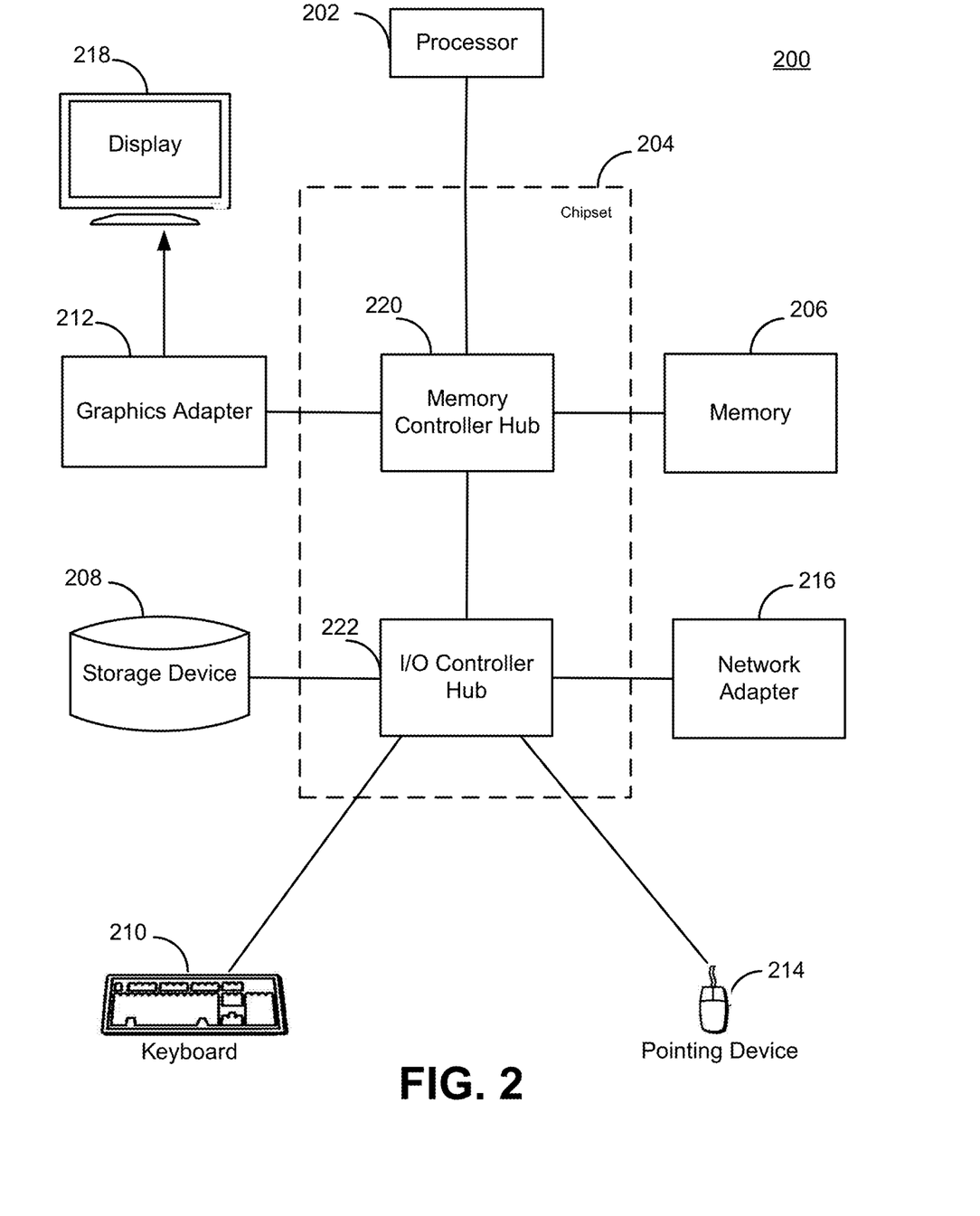
FIG. 2 is a block diagram illustrating an example of a computer for acting as a client device and/or a computer server to provide real time video highlight detection service for mobile computing devices according to one embodiment.

The entities shown in FIG. 1 are implemented using one or more computers. FIG. 2 is a high-level block diagram of a computer 200 for acting as the video highlight model training service 130 and/or a client device 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, the computers acting as the video highlight training service 130 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Video Highlights Model Training

Figure 3:
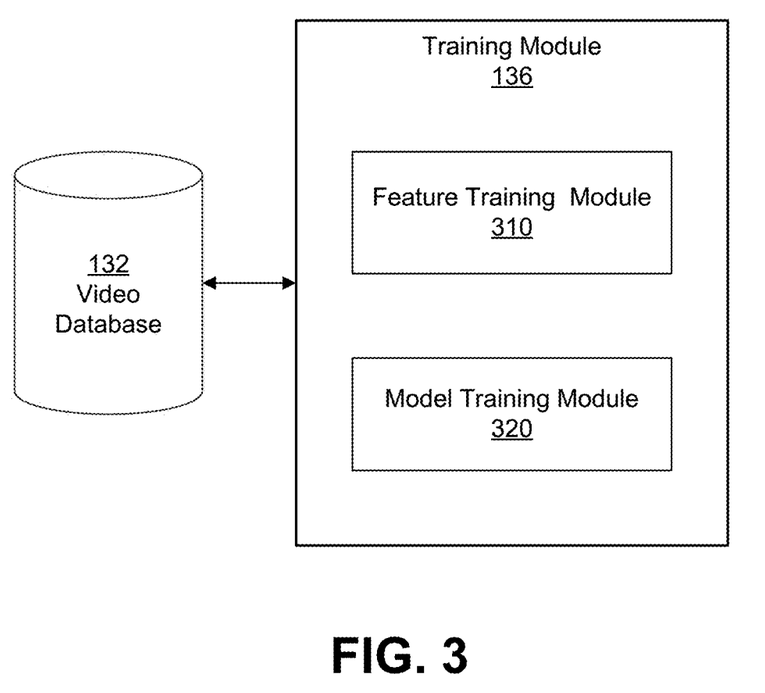
FIG. 3 is a block diagram of a video highlight training module according to one embodiment.

FIG. 3 is a block diagram of a video highlight training module 136 according to one embodiment. The training module 136 illustrated in FIG. 3 has a feature training module 310 and a model training module 320. Other embodiments of the training module 136 can have different and/or additional modules.

The feature training module 310 classifies the sports videos stored in the video database 132 into different classes and generates feature vectors associated with each class of the sports videos. In one embodiment, the feature training module 310 trains a feature model with a deep learning capacity such as convolutional neural network (CNN) to classify the sports videos. The feature model based on CNN has a flexible layered structure to control the depth and breadth of the training and can predict the nature of images, e.g., stationarity of statistics and locality of pixel dependencies, with acceptable accuracy.

In one embodiment, the feature training module 310 trains the CNN feature model using high resolution images of sports video selected from a large dataset, e.g., a large corpus of labeled high resolution images in tens of thousands categories, e.g., multiple million high resolution images in tens of thousands categories. The high resolution images of the large dataset were collected from the Internet and labeled by human lablers using a crowd-sourcing tool. Other embodiments of the feature training module 310 can train the CNN feature model using dataset from other resources.

In one embodiment, the CNN feature model has a layered configuration, which includes a number of learned layers—multiple convolutional layers, a max-pooling layer, a local normalization layer and fully-connected layers. A convolution layer convolves an image with a set of k learnable kernels and generates k feature maps. A max-polling layer performs a non-linear down-sampling over neighboring image pixels around a target pixel to make the feature maps robust to small translations among the neighboring pixels. A local normalization layer normalizes a feature map around a local neighborhood of the image. The local normalization enhances the robustness of the feature map to the differences in illumination and contrast. A fully connected layer computes a non-linear transformation from the feature maps generated from the convolutional layers, max-pooling layer and local normalization layers.

Each of the layers of the CNN feature model learns visual features of an image, where the visual features represents the image at various granularity levels. For example, the features learned by the first convolutional layer represent the most general features of the image, which may be shared by multiple images; the features learned by the last layer describe the visual characteristics specific to the image. Any scheme of fast image feature extraction known to those of ordinary skill in the art can be used by the feature training module 310. In one embodiment, the feature training module 310 trains the CNN feature model on a computer server implementing a deep learning framework for visual feature extraction.

Based on the training, the feature training module 310 classifies the sports videos stored in the video database 132 into different classes. For example, the sports videos stored in the video database 132 are classified by the feature training module 310 into classes, e.g., cycling, American football, soccer, table tennis/ping pong, tennis and basketball. In one embodiment, the feature training module 310 computes a distance, e.g., Euclidean distance, between a representation of a sports video with a representation of another sports video. Responsive to the Euclidean distance between the representations of the two sports videos being smaller than a threshold, the feature training module 310 determines that the two sports videos belong to a same class. For example, the feature training module 310 generates a representation of a sports video based on the appearance of the video frames of the sports video. The appearance of the video frames of a sports video is measured by the average pooling of the visual features of all of the video frames of the sports video, e.g., the mean of the feature vectors associated with the video frames of the sports video.

Based on the training, the feature training module 310 generates frame-based feature vectors associated with each class of the sports video. Examples of frame-based features generated by the feature training module 310 include features extracted by applying Gabor filters, scale-invariant feature transform (SIFT) or histograms of oriented gradients (HoGs) descriptors to the sports videos. Each class of the sports videos is associated with multiple feature vectors describing the characteristics of the class such as motion activity patterns, cut density pattern and tracking of key visual objects associated with the class of the sports videos.

Taking golf games as examples, the associated feature vectors describe the detection of players bending to hit the golf ball and motion trajectory of the golf balls. The feature training module 310 stores the trained CNN feature model and extracted features associated with each class of the sports video in the model database 134.

The model training module 320 trains a video highlight detection model based on the frame-based features extracted by the feature model of the feature training module 310. It is noted that the frame-based features associated with a class of sports video represent a category-level image similarity of sports videos of the class, which mainly corresponds to semantic similarity of the sports videos of the class. However, to detect video highlights in sports videos with acceptable detection accuracy and efficiency, a fine-grained similarity measurement is expected because considerable visual variability within a same class of sports videos still exists.

In one embodiment, the model training module 320 selects a subset of the sports videos from the sports videos classified by the feature model as training data for training the video highlight detection model. The selected sports videos are used as ground truth to learn one or more measurements for detecting video highlights in the sports videos by the video highlight detection model. For example, the model training module 320 selects the subset of the sports videos based on image annotation data associated with the selected sports videos and learns the fine-grained visual similarity of the video frames of the selected sports video based on the analysis of the selected sports videos. The selected sports videos are further evaluated, e.g., by human evaluators or by an automated process, to determine whether each selected sports video includes video highlights.

Based on the training on the selected sports videos, the model training module 320 generates pair-wise frame features vectors associated with each pair of video frames selected from the sports videos. For example, a pair of video frames is both related to cycling sports, thus, the video frames are semantically similar. One frame of the pair has visual features describing a sudden jump of a sportsman engaging in mountain biking and the other frame of the pair has visual features describing a smooth riding along a highway. The visual features describing the sudden jump indicate its associated video frame has a video highlight; the corresponding video frame of the pair does not have a video highlight. The model training module 320 stores the trained video highlight detection model and pair-wise frame features in the model database 134.

Responsive to a request form a mobile computing device, the training module 136 provides the trained feature model, feature vectors associated with classified sports videos, the trained video highlight detection model and pair-wise frame feature vectors to the highlight detection module 112 of the client device 110 for detecting, in real time, video highlights in sports video received by the client devices 110.

Real Time Video Highlights Detection

Figure 4:
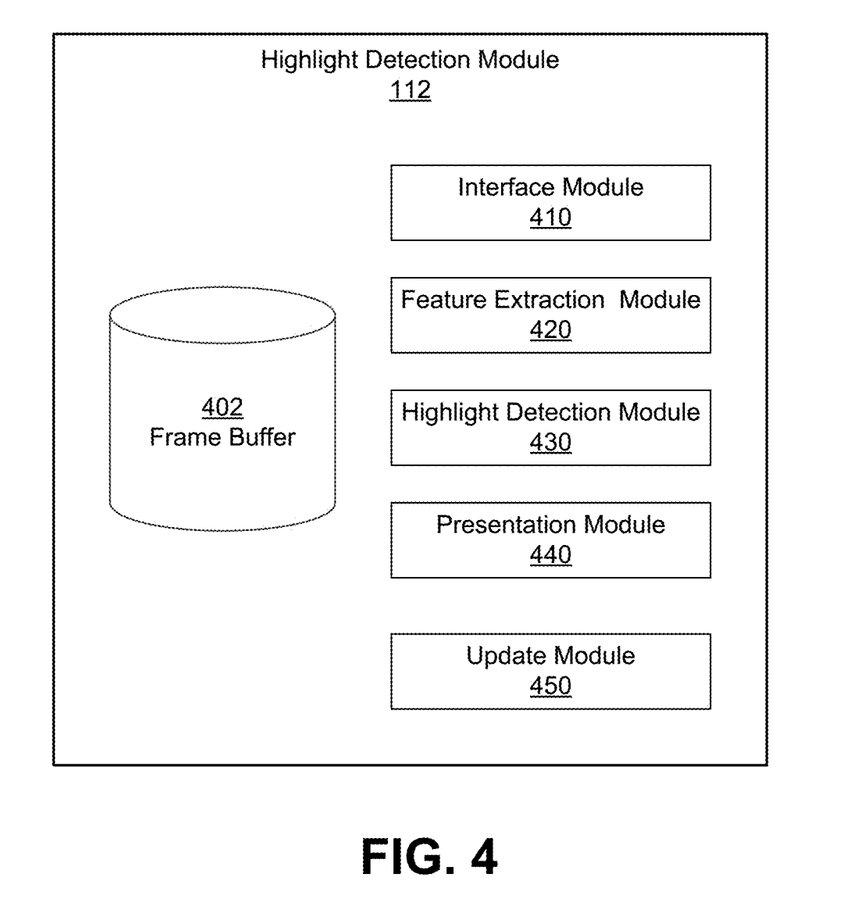
FIG. 4 is a block diagram of a highlight detection module according to one embodiment.

FIG. 4 is a block diagram of a highlight detection module 112 of a client device for detecting video highlights in real time in a sports video according to one embodiment. The highlight detection module 112 shown in FIG. 4 has an interface module 410, a feature extraction module 420, a highlight detection module 430, a presentation module 440, an update module 450 and a frame buffer 402. Other embodiments of the highlight detection module 112 may include additional and/or other entities, e.g., a generic interface module combining the functionalities of the interface module 410 and the presentation module 440. Likewise, the functions performed by the various entities of FIG. 4 may differ in different embodiments.

In one embodiment, the highlight detection module 112 is activated by a computer processor of the client device upon execution of a video highlight detection application on the client device. Upon activation, the interface module 410 requests the feature model, frame-based feature vectors, the detection model and pair-wise frame features from the video highlight model training service 130. In response to receiving the requested models and frame features, the interface module 410 uploads the received the models and frame features to the client device, e.g., storing the received models and frame features in the frame buffer 402.

Figure 7A:
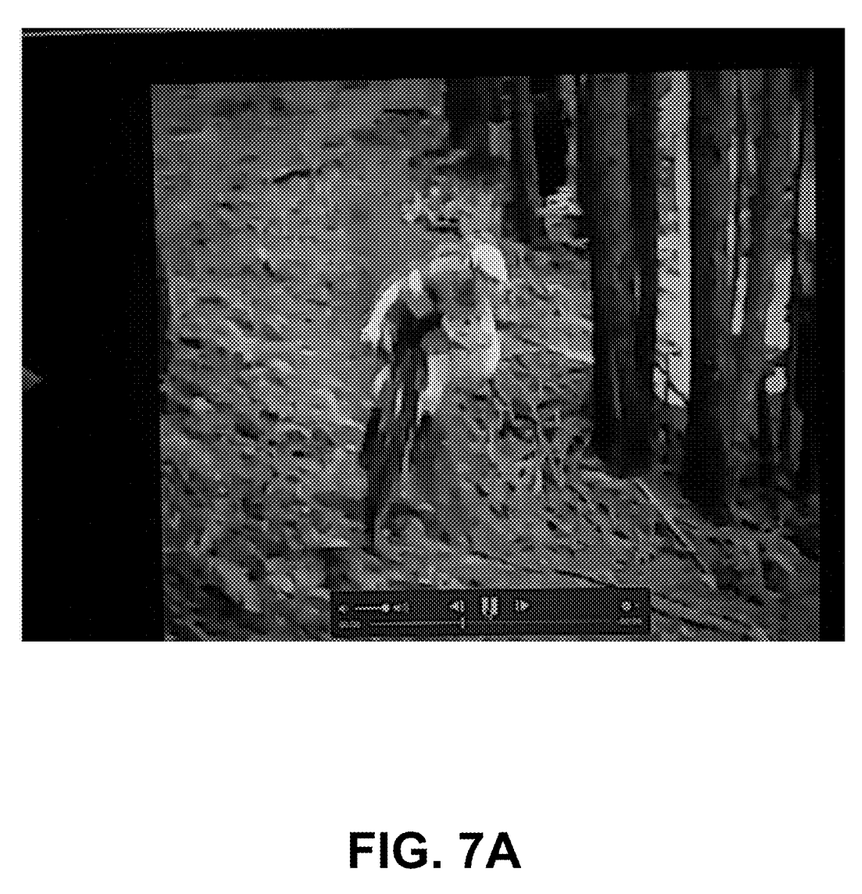
FIG. 7A is an exemplary a video frame of a sports video received by a mobile phone for video highlight detection.

The interface module 410 also receives an input video received by the client device, e.g., a mountain biking activity recorded by a mobile phone of a user or streamed from a video streaming service, and stores the received input video in the frame buffer 402. FIG. 7A shows an example of a video frame of a mountain biking video captured by a user's mobile phone. The interface module 410 stores a segment of the received input video, e.g., 5 seconds of the input video, in the frame buffer 402. The interface module 420 communicates with the feature extraction module 420 to process the video frames of the segment stored in the frame buffer 402. To support continuous real time video highlight detection in the received input video, the interface module 410 continues buffering next segments of the input video. In one embodiment, the interface module 420 buffers a portion of the input video, e.g., 1 second of the input video, which is contained in two temporally consecutive segments of the input video, to provide resilience to random video streaming errors and synchronization between the temporally consecutive segments.

The feature extraction module 420 extracts visual features from the frames of the input video. In one embodiment, the feature extraction module 420 uses the feature model trained by the training module 136 to extract visual features of the input video. For each buffered video frame of the input video, the feature extraction module 420 configures the trained featured model based on metadata associated with the input video, e.g., resolution and frame rate. The configured feature model has one or more convolution layers of a deep convolutional neural network and a max pooling layer and a local normalization layer. The trained feature model generates frame based feature maps at each convolution layer of the deep convolutional neural network. The features from the convolution layers are normalized and combined, e.g., by liner embedding, to generate a feature vector for the frame of the sports video. The feature vector associated with a video frame of the sports video indicates category level semantic characteristics of the video frame, e.g., indicating the input video having visual features specific to a particular class of sports video (e.g., bicycling). The feature extract model 420 stores the frame based feature vectors in the frame buffer 402 and provides the feature vector to the highlight detection module 430 to determine whether the frame associated by the feature vector has a video highlight.

A video highlight of a sports video is a portion of the sports video and represents a semantically important event captured in the sports video, e.g., a short video clip capturing goals or goal attempts in a soccer game video clip. To detect video highlights in a video frame of the input video, the highlight detection module 430 applies the highlight detection model trained by the training module 136 to the feature vector associated with the video frame. In one embodiment, the highlight detection module 430 compares the feature vector with pair-wise frame feature vectors to determine the similarity between the feature vector associated with the video frame and the feature vector of the pair-wise frame feature vectors representing a video highlight. For example, the highlight detection module 430 computes a Euclidean distance between the feature vector associated with the video frame and the pair-wise feature vector representing a video highlight. Based on the comparison, the highlight detection module 430 computes a highlight score for the video frame. The highlight score for the video frame represents a response of a neuron at the last layer of the fully connected layers of the convolutional neural network, which is used to train the feature model and the highlight detection model by the training module 136.

The highlight detection module 430 repeats the similar detection process to each video frame of the input video and generates a highlight score for each video frame of the input video. A larger highlight score of a video frame indicates a higher likelihood that the video frame has a video highlight than another video frame having a smaller highlight score. Other embodiments of the highlight detection module 430 may incorporate other video highlight detection schemes, e.g., audio based video highlight detection such as examples described in U.S. patent application Ser. No. 14/629,852. For example, the highlight detection module 430 may compute the highlight score for a video frame of the input video by averaging a highlight score generated from the highlight detection using the trained feature model and detection model and a highlight score generated from the audio based highlight detection.

Figure 7B:
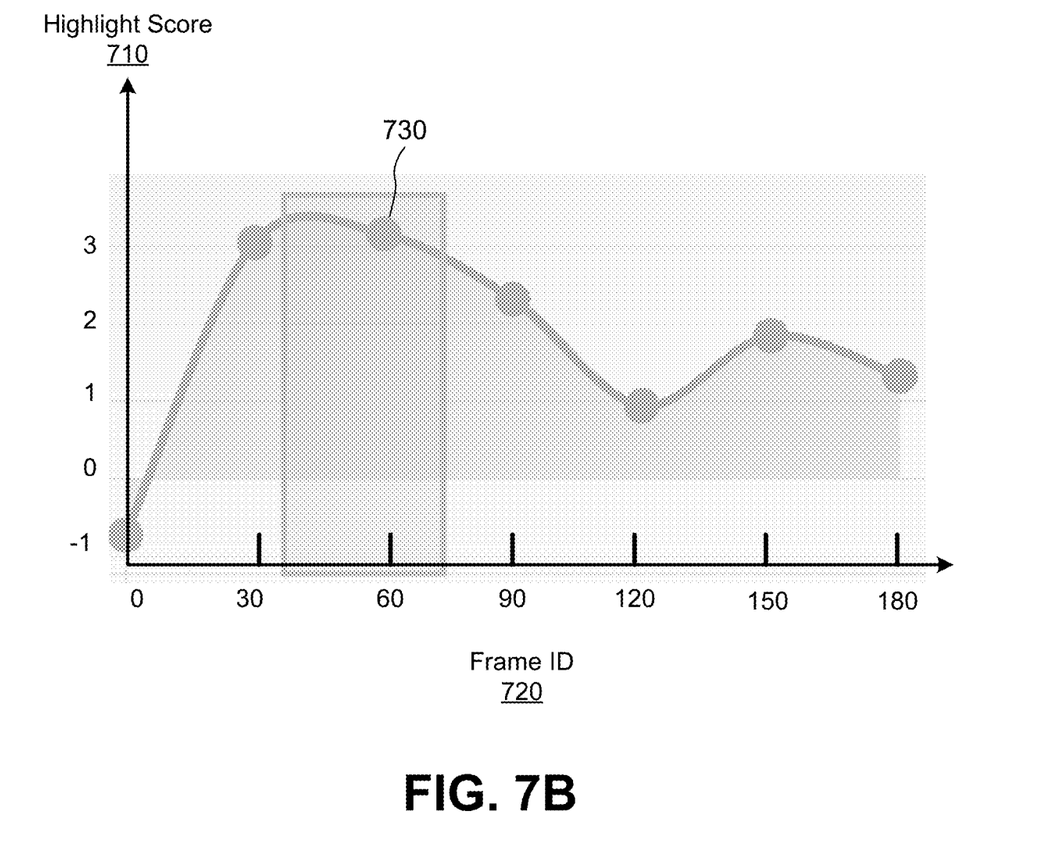
FIG. 7B is an exemplary graphical user interface to present video highlight scores associated with the video frames of the sports video illustrated in FIG. 7A.
Figure 7C:
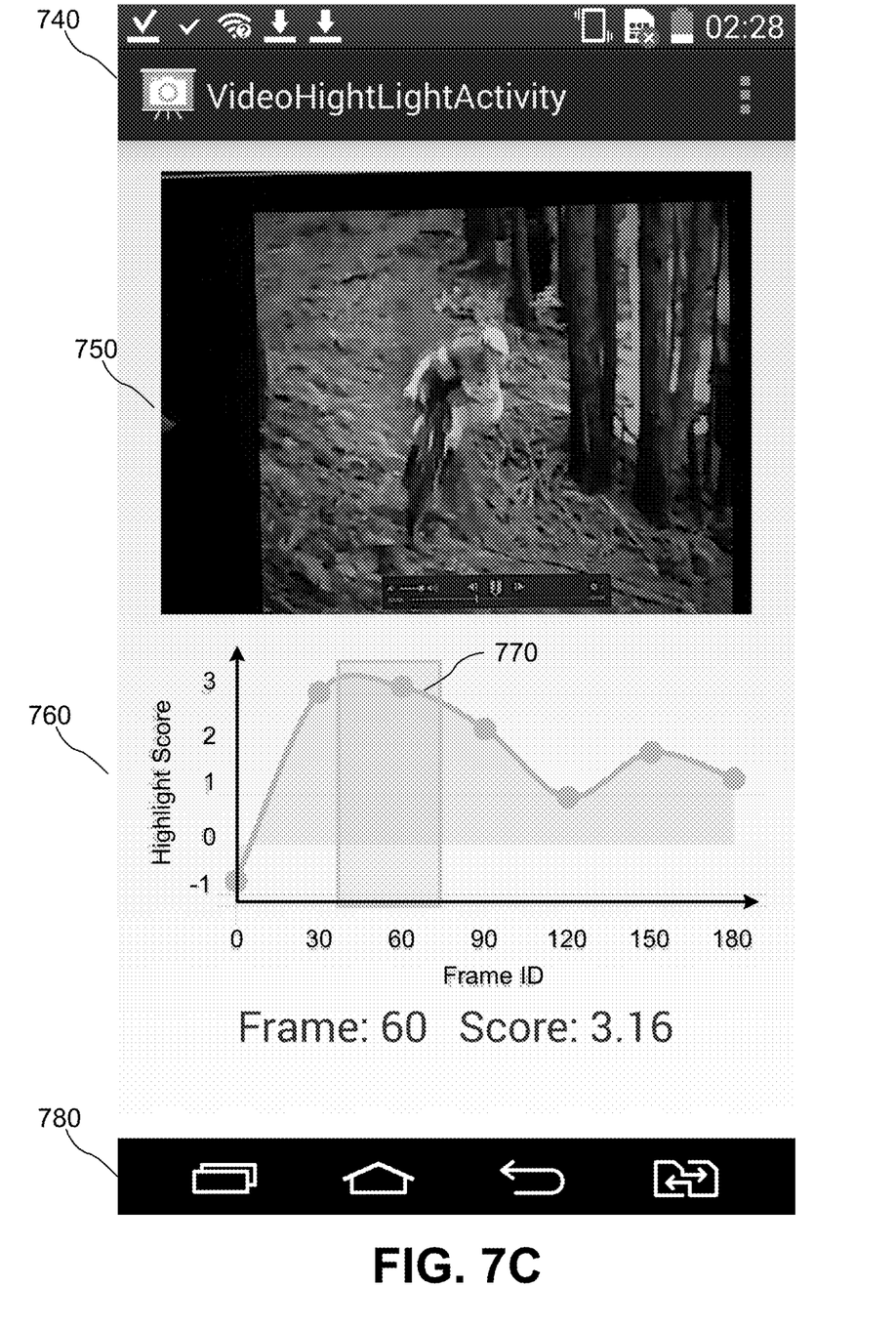
FIG. 7C is an exemplary user interface showing a sports video received by a mobile phone, its associated video highlight scores and a user control interface for interacting with the presented video highlight scores according to one embodiment.

The presentation module 440 receives highlight scores for each video frame of the input video and presents the highlight scores of the input video in a graphical user interface to users of the client device. FIG. 7A shows a video frame of a mountain biking sports video captured by a mobile phone. FIG. 7B is an exemplary graphical user interface to present video highlight scores associated with the video frames of the mountain biking sports video illustrated in FIG. 7A. FIG. 7C is an exemplary user interface 740 showing a video frame 750 of a mountain biking sports video captured by a mobile phone, its associated video highlight scores 760 and an interaction tool 770 for users to interact with the presented video highlight scores according to one embodiment.

In the example shown in FIG. 7B, the horizontal axis of the graphical user interface shows the frame identification 720 of the video frames of the input video; the vertical axis shows the corresponding highlight scores 710 of the video frames of the input video. The example shown in FIG. 7B further shows a graph of highlight scores for 6 identified videos frames, i.e., $30^{th}$, $60^{th}$, $90^{th}$, $120^{th}$, $150^{th}$ and $180^{th}$ frame, of the input video, where the $60^{th}$ frame has the highest highlight score 730 and the video segment between the $30^{th}$ frame and $60^{th}$ frame is likely to represent a video highlight of the input video. The video segment between the $30^{th}$ frame and $60^{th}$ frame is presented as a video highlight predicted by the highlight detection module 430 to the users of the client device.

Users of the client device can interact with the highlight scores of the input video presented in the graphical user interface and the update module 450 detects user interactions with the presented highlight scores of the input video. For example, a user of the client device may drag a pointer pointing to the video highlight predicted by the highlight detection module 430 to a different location on the interface based on what the user is viewing on the client device in real time. The adjustment of the location of the video highlight based on the user real time viewing of the input video is detected by the update module 450. The update module 450 retrieves the frame feature vectors associated with the adjusted video highlight from the frame buffer 402 and provides the retrieved frame feature vectors to the video highlight model training service 130. The highlight model update module 138 of the training service 130 dynamically updates the detection model trained by the training module 136 based on the frame feature vectors associated with the adjusted video highlight received from the update module 450.

Figure 5:
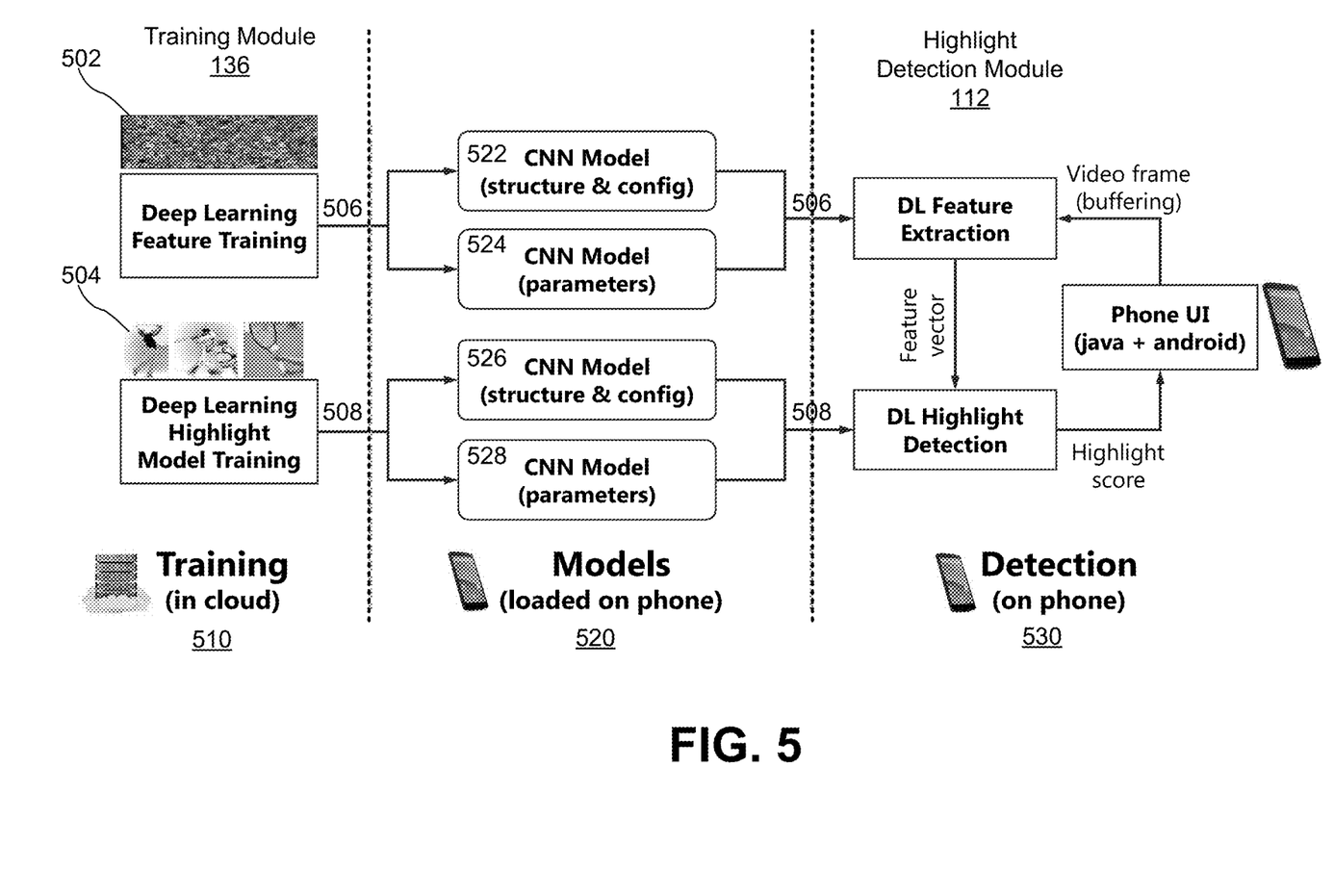
FIG. 5 is an example of detecting highlights in a sports video received by a mobile phone using the training module illustrated in FIG. 3 and the highlight detection module illustrated in FIG. 4 according to one embodiment.

FIG. 5 is an example of detecting video highlights in a sports video received by a mobile phone using the training module 136 illustrated in FIG. 3 and the highlight detection module 112 illustrated in FIG. 4 according to one embodiment. In the example illustrated in FIG. 5, the video highlight detection comprises two phases: training in a cloud computing environment 510 by the training module 136 and real time highlight detection 530 of a sports video received by a mobile phone by the highlight detection module 112. The training phase 510 has two sub-phases: feature model training based on a large corpus of video training data 502, and highlight detection model training based on a subset 504 of the large corpus of video training data. The feature model in the example is a CNN feature model, which has a flexible layered structure and deep learning capacity. For example, the training module 136 trains the CNN feature model on a computer server implementing a deep learning framework. The trained feature model and frame based feature vectors 506 are provided to the mobile phone of the user, e.g., uploaded to the mobile phone 520 upon executing a video highlight detection program on the mobile phone.

The highlight detection model training based on a subset 504 of the large corpus of video training data uses the frame based feature vectors from the feature model training and generates pair-wise frame feature vectors for each pair of video frames having semantically similar visual features. Pair-wise frame feature vectors for a pair of video frame include a features vector representing a video highlight in a first video frame and a feature vector representing non-video highlight in a second video frame. The trained highlight detection model and the pair-wise frame feature vectors 508 are provided to the mobile phone of the user, e.g., uploaded to the mobile phone 520 upon executing a video highlight detection program on the mobile phone.

In real time video highlight detection phase, an interface of the highlight detection module 112 of the mobile phone captures a sports video or receives a sports video from a video streaming service. The highlight detection module 112 buffers video frames of a video segment and extracts frame based feature vectors for each buffered video frame of the sports video using the trained feature model and the feature vectors. The extracted feature vectors of each video frame of the sports video is further analyzed by the highlight detection model received from the training module 136. Based on the analysis of the feature vector associated with a video frame of the sports video, e.g., comparison of the feature vector of the video frame with the pair-wise frame feature vectors from the training module 136, the highlight detection module 112 computes a highlight score for the video frame and provides the highlight score to the interface for presentation to the user.

The interface module presents the highlight scores for all the video frames of the sports video in a graphical user interface, e.g., the interface as illustrated in FIG. 7B. Users of the mobile device may interact with the presentation of the highlight scores, e.g., minor adjustment of the location of a video highlight based on his real time viewing of the sports video. The highlight detection module 112 provides the real time highlight detection data (not shown in FIG. 5) to the training module 136, which dynamically updates the feature model and the highlight detection model based on the real time highlight detection data.

To efficiently detect video highlights in a sports video for a mobile computing device, the trained feature model, the highlight detection model and their associated feature vectors need to be controlled in terms of the memory space of the mobile computing device consumed by the models and feature vectors. Taking the embodiment shown in FIG. 5 as an example, the frame based feature vectors 524 associated with the feature model trained by the training module 136 uses the most memory (e.g., 45~200 MB) compared with the memory used by the feature model 522, the detection model 526 and pair-wise features 528 (e.g., 5 MB). The memory used by the feature model 522 and the detection model 526 is very small, that can be neglected in the evaluation of video highlight detection performance.

It is noted that the size of the memory used by the frame based feature vectors 524 can impact the video highlight detection performance of the video highlight detection module 112 in real time, such as the processing delay and accuracy of the highlight detection. For example, the frame based feature vectors 524 in a size of 217 MB lead to a highlight detection accuracy of 55.2% and 2.13 seconds processing delay; the frame based feature vectors 524 in a size of 153 MB provide a highlight detection accuracy of 51.3% and 1.87 seconds processing delay; and the frame based feature vectors 524 in a size of 45 MB provide a highlight detection accuracy of 49.8% and 1.36 seconds processing delay. In one embodiment, the training module 136 keeps the size of the frame based feature vectors 524 to 45 MB to balance the tradeoff between the detection accuracy and processing delay.

Figure 6:
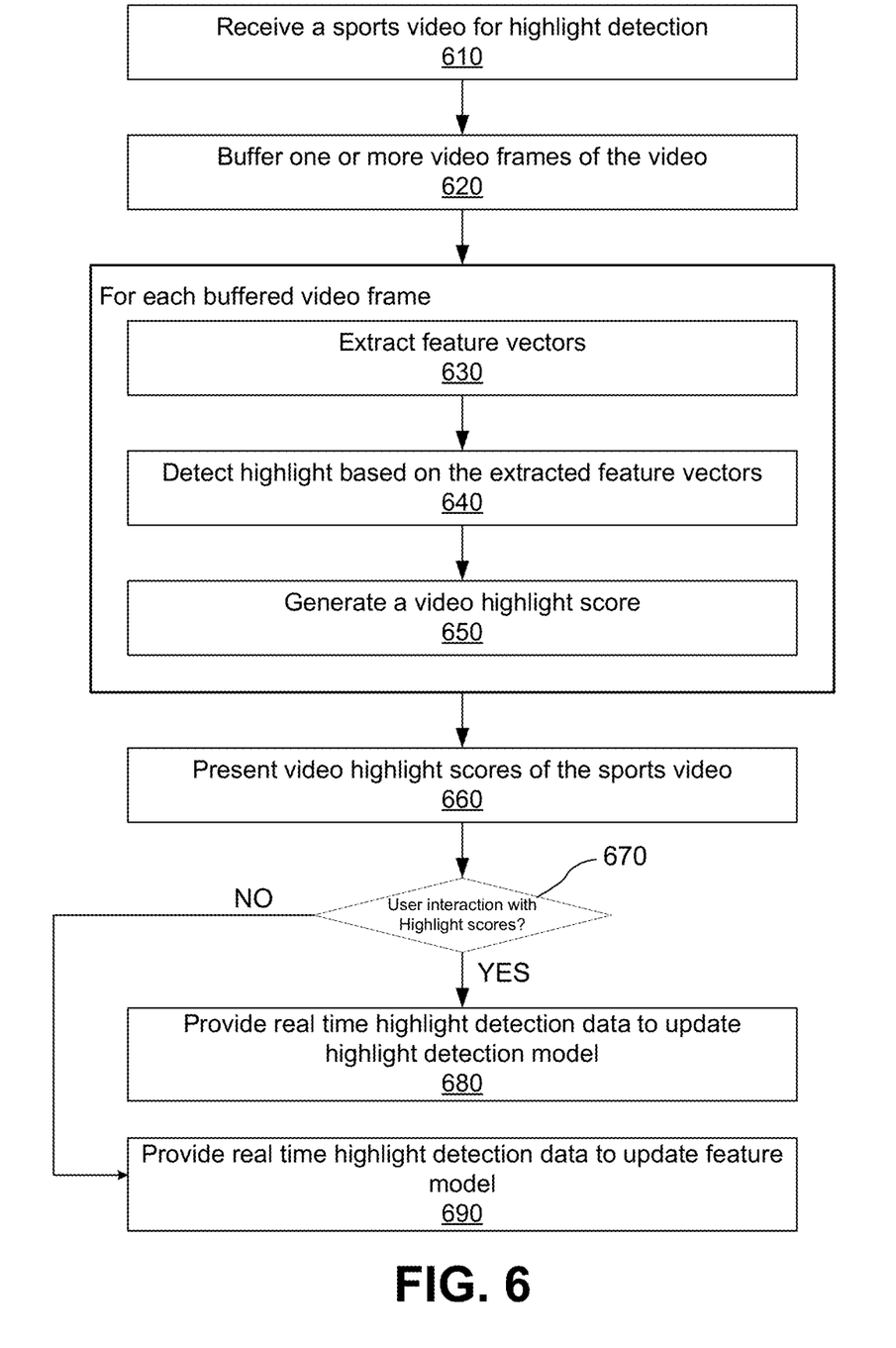
FIG. 6 is an exemplary flowchart illustrating a process for detecting video highlights in a sports video in real time for mobile computing devices according to one embodiment.

FIG. 6 is an exemplary flowchart illustrating a process for detecting video highlights in a sports video in real time for mobile computing devices according to one embodiment. Initially, the highlight detection module 112 of the mobile computing device receives 610 a sports video, e.g., captured by the mobile computing device, for video highlight detection. The highlight detection module 112 buffers 620 video frames of a segment of the sports video in a frame buffer. For each buffered video frame, the highlight detection module 112 extracts 630 the frame based features using a trained feature model and generates one or more feature vectors to describe the visual characteristics of the video frame. The highlight detection module 112 detects 640 a video highlight based on the extracted feature vectors using a trained detection model. Based on the detection, the highlight detection module 112 generates a video highlight score for the video frame, where the video highlight score represents a prediction of whether the video frame has a video highlight. A higher video highlight score indicates a higher probability that the video frame has a video highlight than a video frame having a lower video highlight score. The highlight detection module 112 repeats the video highlight detection for each buffered video frame of the sports video.

The highlight detection module 112 presents the video highlight scores of the video frames of the sports video to users of the mobile computing device. In one embodiment, the highlight detection module 112 presents 660 the video highlight scores of the video frames in a user friendly way, e.g., a graphical user interface, such that the users of the mobile computing device can interact with the presentation of the video highlight scores such as adjusting the location of a video highlight predicted by the highlight detection module 112.

The highlight detection module 112 detects 670 the user interactions with the presentation of the video highlight scores. Responsive to a detected user action with the presentation, the highlight detection module 112 provides 680 the real time highlight detection data and user's interaction with the predicted video highlights to the video highlight training service 130 to update the detection model; otherwise, the highlight detection module 112 provides 690 the real time highlight detection data, e.g., the frame based feature vectors of the video frames of the sports video, to the video highlight training service 130 to update the feature model.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for detecting highlights in a sports video of a sport at a mobile computing device, comprising:
receiving a sports video having a plurality of video frames at the mobile computing device; and
for each video frame of the plurality of video frames:
extracting, using a feature model that is trained to identify classes of sports in a single video frame, a plurality of visual features of the video frame, the feature model is trained, using images of the sports, to extract frame-based features;
identifying a class of sport of the video frame;
identifying pair-wise frame feature vectors that are for the class of sport of the video frame, each pair-wise frame feature vectors comprising:
a first feature vector describing visual characteristics of a first video frame having a highlight and having the class of sport, and
a second feature vector describing visual characteristics of a second video frame having no highlight and having the class of sport,
wherein the first video frame and the second video frame are images of the class of sport of the video frame, and
wherein the pair-wise frame feature vectors are generated during a training phase and based on a model previously trained using a training set comprising first sports images of the class of sport that include highlights and second sports images of the class of sport that do not include highlights, and first frame-based features extracted by the feature model and corresponding to the first sports images, and second frame-based features extracted by the feature model and corresponding to the second sports images; and
generating a highlight score for the video frame by:
determining first distances between the extracted visual features and respective first feature vectors of the pair-wise frame feature vectors;
determining second distances between the extracted visual features and respective second feature vectors of the pair-wise frame feature vector; and
combining the first distances and the second distances to generate the highlight score for the video frame.

2. The method of claim 1, wherein the feature model is trained with a convolutional neural network on a large corpus of videos, and wherein the trained feature model is configured to classify the large corpus of videos into a plurality of classes, and each class of the large corpus of videos is associated with a plurality feature vectors describing category level visual characteristics of the class.

3. The method of claim 1, wherein the highlight score of the video frame represents a prediction of the video frame having a highlight.

4. The method of claim 1, further comprising:
presenting the highlight scores of the plurality of video frames of the sports video in a graphical user interface; and
monitoring user interactions with the presented highlight scores of the plurality of video frames of the sports video.

5. The method of claim 4, further comprising:
responsive to detecting a user interaction with a highlight score of a video frame of the sports video, providing highlight detection data of the sports video and user interaction information to a computer server to update a trained detection model.

6. The method of claim 1, further comprising:
providing highlight detection data of the sports video to a computer server to update a trained feature model.

7. The method of claim 1, wherein the class of sport of the video frame is identified based on the extracted plurality of visual features of the video frame.

8. A non-transitory computer readable storage medium storing executable computer program instructions for or detecting highlights in a sports video of a sport at a mobile computing device, the instructions when executed by a computer processor cause the computer processor to:
receive a sports video having a plurality of video frames at the mobile computing device; and
for each video frame of the plurality of video frames:
extract, using a feature model that is trained to identify classes of sports in a single video frame, a plurality of visual features of the video frame, the feature model is trained, using images of the sports, to extract frame-based features;
identify a class of sport of the video frame;
identify pair-wise frame feature vectors that are for the class of sport of the video frame, each pair-wise frame feature vectors comprising:
a first feature vector describing visual characteristics of a first video frame having a highlight and having the class of sport, and
a second feature vector describing visual characteristics of a second video frame having no highlight and having the class of sport,
wherein the first video frame and the second video frame are images of the class of sport of the video frame, and
wherein the pair-wise frame feature vectors are generated during a training phase and based on a model previously trained using
a training set comprising first sports images of the class of sport that include highlights and second sports images of the class of sport that do not include highlights, and
first frame-based features extracted by the feature model and corresponding to the first sports images, and second frame-based features extracted by the feature model and corresponding to the second sports images; and
generate a highlight score for the video frame by:
determining first distances between the extracted visual features and respective first feature vectors of the pair-wise frame feature vectors;
determining second distances between the extracted visual features and respective second feature vectors of the pair-wise frame feature vector; and
combining the first distances and the second distances to generate the highlight score for the video frame.

9. The computer readable storage medium of claim 8, wherein the feature model is trained with a convolutional neural network on a large corpus of videos, and wherein the trained feature model is configured to classify the large corpus of videos into a plurality of classes, and each class of the sports video is associated with a plurality feature vectors describing category level visual characteristics of the class.

10. The computer readable storage medium of claim 8, wherein the highlight score of the video frame represents a prediction of the video frame having a highlight.

11. The computer readable storage medium of claim 8, further computer program instructions when executed by a computer processor cause the computer processor to:
present the highlight scores of the plurality of video frames of the sports video in a graphical user interface; and
monitor user interactions with the presented highlight scores of the plurality of video frames of the sports video.

12. The computer readable storage medium of claim 11, further computer program instructions when executed by a computer processor cause the computer processor to:
responsive to detecting a user interaction with a highlight score of a video frame of the sports video, provide highlight detection data of the sports video and user interaction information to a computer server to update a trained detection model.

13. The computer readable storage medium of claim 8, further computer program instructions when executed by a computer processor cause the computer processor to:
provide highlight detection data of the sports video to a computer server to update a trained feature model.

14. An apparatus for detecting highlights in a sports video of a sport, comprising:
a non-transitory memory; and
a processor configured to execute instructions stored in the non-transitory memory to:
receive a sports video having a plurality of video frames at the apparatus; and
for each video frame of the plurality of video frames:
extract, using a feature model that is trained to identify classes of sports in a single video frame, a plurality of visual features of the video frame, the feature model is trained, using images of the sports, to extract frame-based features;
identify a class of sport of the video frame;
identify pair-wise frame feature vectors that are for the class of sport of the video frame, each pair-wise frame feature vectors comprising:
a first feature vector describing visual characteristics of a first video frame having a highlight and having the class of sport, and
a second feature vector describing visual characteristics of a second video frame having no highlight and having the class of sport,
wherein the first video frame and the second video frame are images of the class of sport of the video frame, and
wherein the pair-wise frame feature vectors are generated during a training phase and based on a model previously trained using
a training set comprising first sports images of the class of sport that include highlights and second sports images of the class of sport that do not include highlights, and
first frame-based features extracted by the feature model and corresponding to the first sports images, and second frame-based features extracted by the feature model and corresponding to the second sports images; and generate a highlight score for the video frame by:
determining first distances between the extracted visual features and respective first feature vectors of the pair-wise frame feature vectors;
determining second distances between the extracted visual features and respective second feature vectors of the pair-wise frame feature vector; and
combining the first distances and the second distances to generate the highlight score for the video frame.

15. The apparatus of claim 14, wherein the feature model is trained with a convolutional neural network on a large corpus of videos, and wherein the trained feature model is configured to classify the large corpus of videos into a plurality of classes, and each class of the large corpus of videos is associated with a plurality feature vectors describing category level visual characteristics of the class.

16. The apparatus of claim 14, wherein the highlight score of the video frame represents a prediction of the video frame having a highlight.

17. The apparatus of claim 14, wherein the processor is further configured to execute the instructions stored in the non-transitory memory to:
present the highlight scores of the plurality of video frames of the sports video in a graphical user interface; and
monitor user interactions with the presented highlight scores of the plurality of video frames of the sports video.

18. The apparatus of claim 17, wherein the processor is further configured to execute the instructions stored in the non-transitory memory to:
responsive to detecting a user interaction with a highlight score of a video frame of the sports video, provide highlight detection data of the sports video and user interaction information to a computer server to update a trained detection model.

19. The apparatus of claim 14, wherein the processor is further configured to execute the instructions stored in the non-transitory memory to:
provide highlight detection data of the sports video to a computer server to update a trained feature model.

20. The apparatus of claim 14, wherein the class of sport of the video frame is identified based on the extracted plurality of visual features of the video frame.

* * * * *